United States Patent
Li

(10) Patent No.: US 12,464,532 B2
(45) Date of Patent: Nov. 4, 2025

(54) DATA TRANSMISSION METHOD AND APPARATUS, AND COMMUNICATION DEVICE

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 532 days.

(21) Appl. No.: 17/883,123

(22) Filed: Aug. 8, 2022

(65) Prior Publication Data

US 2022/0386357 A1    Dec. 1, 2022

Related U.S. Application Data

(63) Continuation of application No. PCT/CN2020/074654, filed on Feb. 10, 2020.

(51) Int. Cl.
| | | |
|---|---|---|
| *H04W 72/23* | (2023.01) | |
| *H04L 1/00* | (2006.01) | |
| *H04L 1/1867* | (2023.01) | |
| *H04W 56/00* | (2009.01) | |
| *H04W 72/54* | (2023.01) | |

(52) U.S. Cl.
CPC .......... *H04W 72/23* (2023.01); *H04L 1/0061* (2013.01); *H04L 1/1883* (2013.01); *H04W 56/001* (2013.01); *H04W 72/54* (2023.01)

(58) Field of Classification Search
CPC ..... H04L 1/1883; H04L 1/1848; H04W 72/23
See application file for complete search history.

(56) References Cited

U.S. PATENT DOCUMENTS

| | | | |
|---|---|---|---|
| 2017/0055242 A1* | 2/2017 | Kusashima | H04L 5/0051 |
| 2020/0015246 A1 | 1/2020 | Vilaipornsawai et al. | |
| 2021/0084596 A1* | 3/2021 | Lee | H04W 52/146 |
| 2022/0151009 A1* | 5/2022 | Zhang | H04L 1/188 |

(Continued)

FOREIGN PATENT DOCUMENTS

| | | |
|---|---|---|
| CN | 101686551 A | 3/2010 |
| CN | 105743591 A | 7/2016 |
| CN | 108513735 A | 9/2018 |

(Continued)

OTHER PUBLICATIONS

State Intellectual Property Office of the People's Republic of China, Office Action and Search Report Issued in Application No. 202080000241X, Dec. 28, 2023, 15 pages.

ISA State Intellectual Property Office of the People's Republic of China, Written Opinion of the International Searching Authority Issued in Application No. PCT/CN2020/074654, Nov. 5, 2020, WIPO, 8 pages.

(Continued)

*Primary Examiner* — Raj Jain
(74) *Attorney, Agent, or Firm* — Volpe Koenig

(57) ABSTRACT

Examples of the present disclosure relate to a data transmission method and apparatus, and a communication device. The method includes: during a first time length prior to a start moment of a measurement gap, receiving Downlink Control Information (DCI); in response to determining that the DCI schedules transmission of a predetermined service, starting a first timer; during a period when the first timer is running, keeping downlink communication with a serving cell, where the downlink communication includes transmitting the predetermined service.

18 Claims, 5 Drawing Sheets

(56) References Cited

U.S. PATENT DOCUMENTS

2022/0386357 A1* 12/2022 Li .................... H04W 72/54

FOREIGN PATENT DOCUMENTS

| CN | 109391958 A | 2/2019 |
| --- | --- | --- |
| CN | 109792369 A | 5/2019 |
| CN | 110351898 A | 10/2019 |
| CN | 110602670 A | 12/2019 |
| CN | 110719646 A | 1/2020 |
| WO | 2018171476 A1 | 9/2018 |
| WO | 2019029369 A1 | 2/2019 |
| WO | 2020/007312 A1 | 1/2020 |
| WO | 2020/011096 A1 | 1/2020 |

OTHER PUBLICATIONS

MediaTek Inc, "Correction on the starting time of DRX HARQ RTT timers", R2-1806163, 3GPP TSG-RAN WG2 Meeting #101Bis, Sanya, China, Apr. 16-20, 2018, 6 pages.

Huawei, HiSilicon, "Discussion on LS on gap-assisted serving cell measurement", R4-1810699, 3GPP TSG-RAN WG4 Meeting #88, Gothenburg, SE, Aug. 20-24, 2018, 3 pages.

Chinese Office Action issued on Jun. 10, 2024 for Chinese Patent Application No. 202080000241.X.

ISA State Intellectual Property Office of the People's Republic of China, International Search Report Issued in Application No. PCT/CN2020/074654, Nov. 5, 2020, WIPO, 4 pages.

* cited by examiner

DATA TRANSMISSION METHOD AND APPARATUS, AND COMMUNICATION DEVICE

CROSS REFERENCE TO RELATED APPLICATIONS

The present application is a continuation of International Application No. PCT/CN2020/074654, filed on Feb. 10, 2020, which is incorporated herein by reference in its entirety.

TECHNICAL FIELD

The present application relates to the field of wireless communication technology but is not limited to the field of wireless communication technology, and in particular relates to data transmission methods and apparatuses, and communication devices.

BACKGROUND

In the 5$^{th}$ Generation (5G) cellular mobile communication technology, e.g., a New Radio (NR) system, a User Equipment (UE) is expected to periodically measure a reference signal from at least one neighbor cell for performing mobility measurement. In a case that the bandwidth of the UE's receiver is not sufficient to cover both frequencies of a serving cell and the neighbor cell, the UE can perform measurement on the neighbor cell at a regular interval, and a base station can configure a measurement gap for inter-frequency signal measurement for the UE. For example, a measurement gap periodicity may be 40 ms, each measurement gap may last 6 ms, an offset configured for the measurement gap may be 20 ms, and then 20-25 ms, 60-65 ms and 100-105 ms are measurement gaps. A neighbor cell can be an inter-frequency cell.

For an inter-frequency cell, the UE can also listen to a Synchronization Signal Block (SSB) from the inter-frequency cell. The base station can set SSB Measurement Timing Configuration (SMTC) for the UE. A configuration content of the SMTC includes a listening periodicity, an offset, a duration, and an IDentity (ID) of a cell whose SSB is listened for. For example, the listening periodicity may be 80 ms, the offset may be 40 ms, and the duration may be 5 ms, and then the UE can listen to the SSB of a neighbor cell during 40-44 ms, 120-124 ms, 200-204 ms, and the like.

SUMMARY

In view of the above, examples of the present disclosure provide a data transmission method and apparatus, and a communication device.

According to a first aspect of examples of the present disclosure, a data transmission method is provided, applicable to user equipment. The method includes:
receiving Downlink Control Information (DCI) during a duration prior to a measurement gap, where an end moment of the duration is the start moment of the measurement gap, and a time length of the duration refers to a first time length;
starting, in response to determining that the DCI schedules transmission of a predetermined service, a first timer; and
keeping, during a period when the first timer is running, downlink communication with a serving cell, where the downlink communication includes receiving the predetermined service.

According to a second aspect of the present disclosure, a data transmission method is provided, applicable to a base station. The method includes:
starting, in response to transmitting target Downlink Control Information (DCI), a second timer during a duration prior to a measurement gap, where an end moment of the duration is the start moment of the measurement gap, and a time length of the duration refers to a first time length; and
keeping, during a period when the second timer is running, downlink communication with a User Equipment (UE), where the downlink communication includes transmitting the predetermined service.

According to a third aspect of the present disclosure, a data transmission apparatus is provided, applicable to user equipment. The apparatus includes a first receiving module, a first timing module and a first transmitting module, where
the first receiving module is configured to receive Downlink Control Information (DCI) during a first time length prior to a start moment of a measurement gap;
the first timing module is configured to start, in response to determining that the DCI schedules transmission of a predetermined service, a first timer; and
the first transmitting module is configured to keep, during a period when the first timer is running, downlink communication with a serving cell, where the downlink communication includes transmitting the predetermined service.

According to a fourth aspect of the present disclosure, a data transmission apparatus is provided, applicable to a base station. The apparatus includes a first sending module, a second timing module and a third transmitting module, where
the first sending module is configured to transmit Downlink Control Information (DCI) during a first time length prior to a start moment of a measurement gap;
the second timing module is configured to start, in response to determining that the DCI schedules transmission of a predetermined service, a second timer; and
the third transmitting module is configured to keep, during a period when the second timer is running, downlink communication with a serving cell, where the downlink communication includes transmitting the predetermined service.

According to a fifth aspect of examples of the present disclosure, there is provided a communication device including a processor, a transceiver, a memory and an executable program stored on the memory and executed by the processor, where the processor executes the executable program to implement steps of a data transmission method of the first aspect.

According to a sixth aspect of examples of the present disclosure, there is provided a communication device including a processor, a transceiver, a memory and an executable program stored on the memory and executed by the processor, where the processor executes the executable program to implement steps of a data transmission method of the second aspect.

Examples of the present disclosure provide a data transmission method and apparatus, and a communication device. A user equipment can receive DCI during a first time length prior to a start moment of a measurement gap; start a first timer in response to determining that the DCI schedules transmission of a predetermined service; and keep downlink communication with a serving cell during a period when the first timer is running, where the downlink communication includes transmitting the predetermined service. In this way, during the period when the first timer is running, the user equipment and a base station can complete the transmission of the predetermined service without being affected by inter-frequency signal measurement, which reduces situations that the transmission of the predetermined service is stopped due to performing the inter-frequency signal measurement, reduces the transmission latency of the predetermined service and meets requirements of low-latency service transmission.

It should be understood that the above general description and the following detailed description are just exemplary and explanatory, and cannot be construed as a limit to the present disclosure.

BRIEF DESCRIPTION OF THE DRAWINGS

The drawings herein are incorporated into the specification and constitute a part of the specification, illustrate examples according to the present disclosure, and are used to explain the principle of the present disclosure along with the specification.

DETAILED DESCRIPTION OF THE EMBODIMENTS

Examples will be described in detail here, and examples thereof are illustrated in the accompanying drawings. When the following description relates to the drawings, unless otherwise indicated, the same reference signs in different drawings indicate the same or similar elements. The implementation manners described in the following examples do not represent all implementation manners consistent with the present disclosure. Rather, they are merely examples of devices and methods consistent with some aspects of the present disclosure as set forth in the appended claims.

Terms used in examples of the present disclosure are merely intended to describe particular examples and are not intended to limit examples of the present disclosure. The singular forms "a," "said" and "the" are also intended to include plural forms, unless the context clearly indicates otherwise. It should also be understood that the term "and/or" as used herein refers to and includes any or all possible combinations of one or more associated listed items.

It should be understood that, although the terms first, second, third and the like may be used herein to describe various information, the information should not be limited by these terms. These terms are only used to distinguish one category of information from another. For example, without departing from the scope of examples of the present disclosure, first information may be referred as second information; and similarly, second information may also be referred as first information. Depending on the context, for example, the word "if" as used herein may be interpreted as "at the time of" or "when" or "in response to determining".

Figure 1:
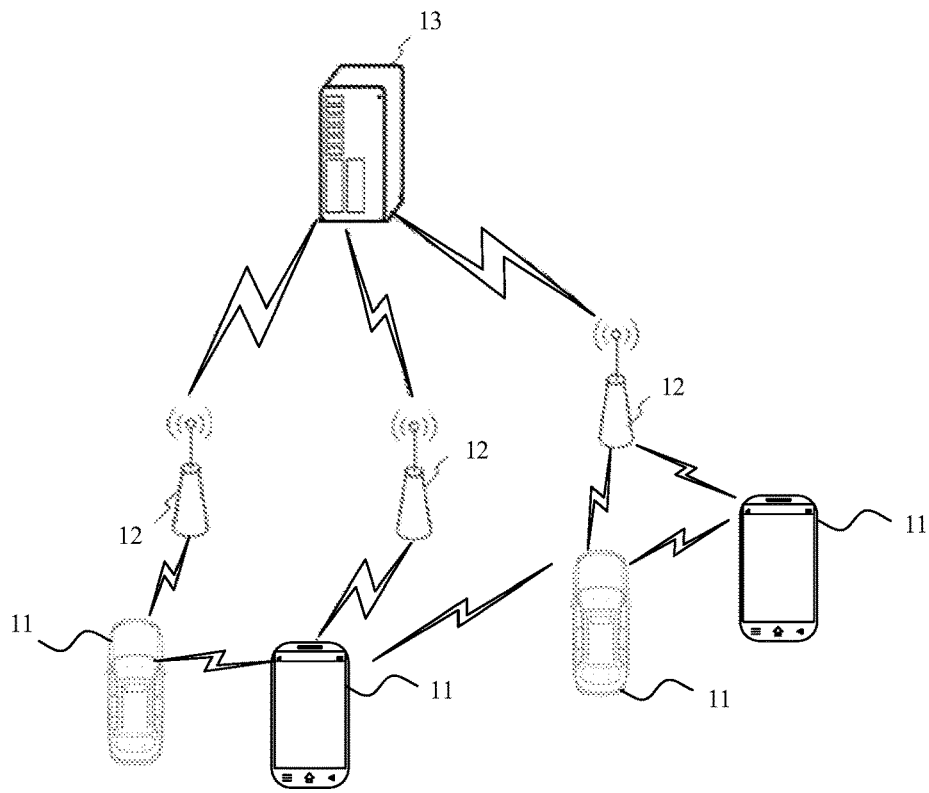
FIG. 1 is a structural schematic diagram illustrating a wireless communication system according to an example.

FIG. 1 is a structural schematic diagram illustrating a wireless communication system according to an example of the present disclosure. As shown in FIG. 1, the wireless communication system is a communication system based on cellular mobile communication technology. The wireless communication system may include several terminals 11 and several base stations 12.

The terminal 11 may be referred to as a device providing voice and/or data connectivity to a user. The terminal 11 may communicate with one or more core networks through a Radio Access Network (RAN). The terminal 11 may include a terminal in an Internet of Things, such as a sensor device, a mobile phone (also called a cellular phone), and a computer having a terminal of an Internet of Things, such as a fixed, portable, pocket-size, handheld, or computer-inbuilt or vehicle-mounted apparatus. The terminal 11 may also include, for example, a STAtion (STA), a subscriber unit, a subscriber station, a mobile station, a mobile, a remote station, an access point, a remote terminal, an access terminal, a user terminal, a user agent, a user device, or a user equipment. Optionally, the terminal 11 may also include a device carried on an unmanned aerial vehicle, or a vehicle-mounted device, for example, a trip computer having wireless communication function, or a wireless communication device externally connected to a trip computer. Optionally, the terminal 11 may be a roadside device, for example, may be a road lamp, a signal lamp or other roadside devices having wireless communication function.

The base station 12 may include a network side device in the wireless communication system. The wireless communication system may be the $4^{th}$-generation mobile communication technology (4G) system, which is also called the Long Term Evolution (LTE) system. Optionally, the wireless communication system may also include the 5G system, which is also called the New Radio (NR) system or the 5G NR system. Optionally, the wireless communication system may also include a next generation system of the 5G system. An access network in the 5G system may be referred to as New Generation-Radio Access Network (NG-RAN). Or the MTC (Machine Type Communication) system.

The base station 12 may include an evolved Node B (eNB) base station employed in the 4G system. Optionally, the base station 12 may also include a base station (gNB) adopting a centralized-distributed architecture in the 5G system. When adopting the centralized distributed architecture, the base station 12 usually includes a Central Unit (CU) and at least two Distributed Units (DUs). In the Central Unit, protocol stacks of a Packet Data Convergence Protocol (PDCP) layer, a Radio Link Control (RLC) layer and a Media Access Control (MAC) layer are disposed; and in the Distributed Unit(s), a Physical (PHY) layer protocol stack is disposed. Specific implementations of the base station 12 are not limited in the examples of the present disclosure.

Wireless connection between the base station 12 and the terminal 11 may be established through an air interface. In different implementations, the air interface is an air interface based on the $4^{th}$-generation mobile communication network technology (4G) standards; the air interface is an air interface based on the fifth generation mobile communication network technology (5G) standards, for example, the air interface is New Radio; or, the air interface may also be an air interface based on standards of a next generation mobile communication network technology of 5G.

In some embodiments, End to End (E2E) connection may further be established between the terminals 11, for example, in the scenarios of Vehicle to Vehicle (V2V) communication, Vehicle to Infrastructure (V2I) communication, and Vehicle to Pedestrian (V2P) communication and the like in Vehicle to everything (V2X) communication.

In some examples, the above wireless communication system may further include a network management device 13.

Several base stations 12 are connected to the network management device 13 respectively. The network management device 13 may include a core network device in the wireless communication system, for example, the network management device 13 may include a Mobility Management Entity (MME) in an Evolved Packet Core (EPC). Alternatively, the network management device may also include one or more other core network devices, such as a Serving GateWay (SGW), a Public Data Network GateWay (PGW), Policy and Charging Rules Function (PCRF), a Home Subscriber Server (HSS), and the like. The implementation morphology of the network management device 13 is not limited in the examples of the present disclosure.

An executing entity involved in examples of the present disclosure includes, but is not limited to, a user equipment, a base station and the like, that use 5G NR technology for communication.

An application scenario of examples of the present disclosure includes that, in a case that a bandwidth of a User Equipment's (UE's) receiver is not sufficient to cover both service frequencies of the present cell and a neighbor cell to be measured, the UE can measure a reference signal and the like from the neighbor cell at a certain measurement gap. During a measurement gap where the UE performs radio signal measurement on the neighbor cell to be measured, normal data service transmission and reception and possible intra-frequency measurement performed by the UE with the serving cell may be interrupted. When the measurement gap ends, the UE may return to a frequency of the serving cell and continue the normal data service transmission and reception and the possible intra-frequency measurement.

In a case that the bandwidth of the UE's receiver is not sufficient to cover both service frequencies of the present cell and a cell to be measured, during a duration configured by Synchronization Signal Block (SSB) Measurement Timing Configuration (SMTC), the normal data service transmission and reception between the UE and a serving cell is interrupted to listen to a SSB from a neighbor cell. When the duration ends, the UE may return to the frequency of the serving cell and continue the normal data service transmission and reception or the like.

In 5G NR, certain types of services need low latency, such as a type of Ultra Reliable and Low Latency Communication (URLLC) service. This type of service typically requires that a transmitter with data to be transmitted can obtain transmission resources as soon as possible, thereby reducing latency due to the service waiting in the transmitter's buffer and minimizing the air interface's transmission latency. When the UE performs measurement on one or more inter-frequency signals during the measurement gap or the SMTC duration, the UE's receiver cannot receive downlink information of the serving cell, thus causing latency in data transmission.

Figure 2:
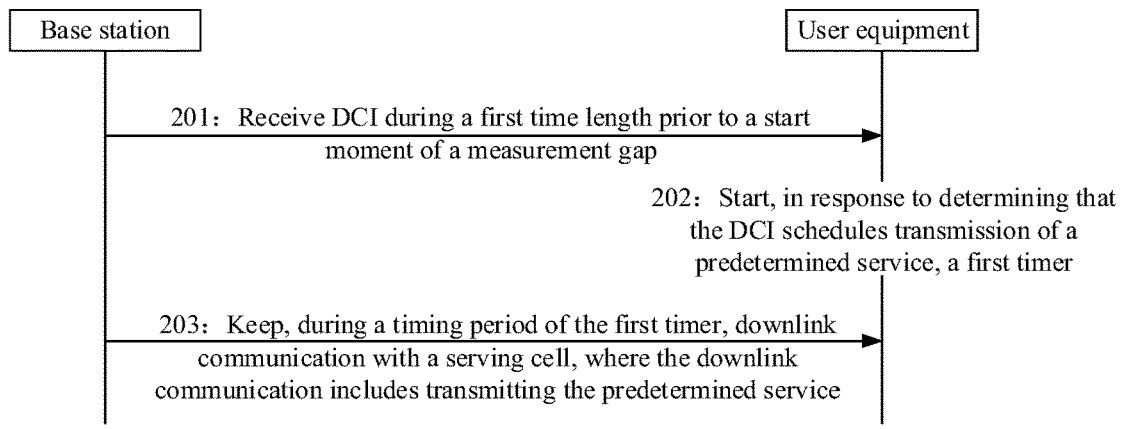
FIG. 2 is a schematic flowchart illustrating a data transmission method according to an example.

As shown in FIG. 2, the present example provides a data transmission method, which can be applied to a UE for wireless communication. The method includes the following steps.

At step 201, Downlink Control Information (DCI) is received during a duration prior to a measurement gap, where an end moment of the duration is the start moment of the measurement gap, and a time length of the duration refers to a first time length.

At step 202, in response to determining that the DCI schedules transmission of a predetermined service, a first timer is started.

At step 203, during a period when the first timer is running, downlink communication with a serving cell is kept, where the downlink communication includes receiving the predetermined service.

The measurement gap may be a periodic measurement period configured by a base station for the UE to perform inter-frequency signal measurement. In a case that a bandwidth of the UE's receiver is not sufficient to cover both signal frequencies of a serving cell and an inter-frequency cell, the UE cannot perform inter-frequency signal measurement on the inter-frequency cell and data transmission with the serving cell at the same time. During the measurement gap, normal data service transmission and reception between the UE and the serving cell can be interrupted, which results in latency in downlink data transmission. When the measurement gap ends, the UE can return to the frequency of the serving cell, and continue the normal data service transmission and reception and possible intra-frequency measurement.

An inter-frequency signal may be a signal with a central frequency different from a central frequency of a serving cell where the UE is currently located. The inter-frequency signal may also be a signal of an inter-frequency cell with one or more Band Width Parts (BWPs) other than a BWP currently occupied by the UE. The inter-frequency signal may further be one or more signals of inter-frequency cells with different central frequencies or different Sub-Carrier Spaces (SCSs) in SSB measurement and the like. The inter-frequency signal measurement may indicate performing signal quality measurement on an inter-frequency signal or listening to an inter-frequency signal.

The first time length can be determined according to a scheduling interval of the predetermined service or the like. The first time length may be greater than or equal to a time interval between two transmission resources of the predetermined service. In this way, during the first time length, in a case that the base station is transmitting or is to transmit the predetermined service, it is more likely that scheduling for the predetermined service is transmitted, that is the DCI in step 201 and the DCI also refers to as target DCI, so that the UE can determine whether there will be scheduling for the predetermined service based on the received target DCI. The first time length cannot be set too long. Otherwise, the UE needs to start the first timer for pieces of target DCI, which may increase the computing burden on the UE. When target DCI is received within the first time length, the UE can set to start the first timer and maintain downlink communication with the serving cell within a period when the first timer is running from a time of receiving the DCI. In this way, a first timer can be set for a predetermined service whose transmission resource may overlap with a measurement gap in the time domain, so that service data can be transmitted within a running period and the transmission latency of the predetermined service can be reduced.

The predetermined service may be a service with a higher priority, or a downlink data service that requires shorter latency, for example, URLLC service data. The base station may issue target DCI to schedule a predetermined service, and the DCI may be received by the UE. The contents in DCI of a physical layer can be used to indicate whether the scheduled downlink service is a high-priority service. In the case where the DCI indicates that the scheduled downlink service is a high-priority service, the UE determines that the service is the predetermined service.

Keeping downlink communication with the serving cell may include receiving the predetermined service transmitted by the serving cell, or may also include that the UE receives a downlink signal transmitted by the serving cell to the UE through downlink, or the UE listens to a downlink signal from the serving cell through the downlink, and the like. The downlink signal includes, but is not limited to, one or more controlling instructions and downlink data transmitted by the serving cell to the UE.

Similarly, the base station keeping downlink communication with the UE may include transmitting the predetermined service, or may also include that the serving cell transmits a downlink signal to the UE through the downlink when needed, or the serving cell maintains a downlink connection with the UE.

When the UE determines that the received DCI is used to schedule transmission of the predetermined service, the UE may set a running period for the first timer, and maintain downlink communication with the serving cell within the period when the first timer is running. The period when the first timer is running may be determined according to a time period for the UE to resolve the DCI, a time period for transmission resources of the predetermined service, and the like, which ensures that, within the period when the first timer is running, the UE can complete the reception of predetermined service data that is involved in the current target DCI scheduling. The UE does not perform inter-frequency signal measurement during the period when the first timer is running. Therefore, during the period when the first timer is running, the transmission of service data may not be affected by the inter-frequency signal measurement, thereby reducing the latency for the transmission of service data.

When the base station determines to perform transmission of the predetermined service, the base station may transmit target DCI, set a second timer and a running period for the second timer, and maintain downlink communication with the UE within the period when the second timer is running. The period when the second timer is running may be determined according to a time period for the UE to resolve the DCI, a time period for transmission resources of the predetermined service, and the like, which ensures that, within the period when the second timer is running, the UE can complete the reception of the predetermined service data that is involved in the current target DCI scheduling. The UE does not perform inter-frequency signal measurement during the period when the second timer is running. The first timer can be kept in synchronization with the second timer, so that the UE and the base station can keep downlink communication with each other at the same time.

Figure 3:
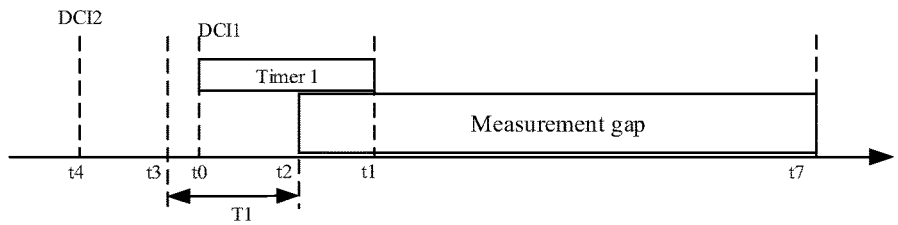
FIG. 3 is a schematic sequence diagram of a timer and a measurement gap according to an example.

As shown in FIG. 3, at time t0, the UE receives DCI 1 for scheduling downlink data with a first priority, which is transmitted at PDSCH resources, t0 is within a time period T1 prior to the measurement gap. The UE starts a first timer at time t0, and the base station starts a second timer at time t0. Running periods of the first timer and the second timer may be the same, and a time interval from time t0 to time t1 indicates the running periods of the first timer and the second timer. During the period when the first timer is running, that is, during the period when the second timer is running, the UE keeps downlink communication with the base station. In a case that a time period overlapping with the measurement gap exists within the running periods of the two timers, during the overlapped time period, for example, during a time period between t2 to t1, the UE can keep downlink communication with the base station for downlink data transmission.

As shown in FIG. 3, at time t4, the UE receives DCI 2 for scheduling a predetermined service with the first priority which is transmitted at PDSCH resources, and t4 is located before the time period T1 prior to the measurement gap, that is, before time t3, so a timer may not be set for DCI 2.

In this way, during the period when the first timer is running, the UE and the base station can complete the transmission of the predetermined service without being affected by the inter-frequency signal measurement, which reduces situations that the transmission of the predetermined service is stopped due to performing the inter-frequency signal measurement, reduces the transmission latency of the predetermined service and meets requirements of low-latency service transmission.

In one example, the data transmission method can further include: in response to determining that next DCI is received during the period when the first timer is running, and determining that the next DCI indicates scheduling transmission of a predetermined service, resetting the first timer. In a case that the UE continues receiving the next target DCI for scheduling the predetermined service by the base station during the period when the first timer is running, the UE may reset the first timer for timing with respect to the target DCI, for example, the UE may clear existing count of the first timer and restart timing. When the DCI is received, the downlink communication with the serving cell is maintained during the period when the first timer is running.

Figure 4:
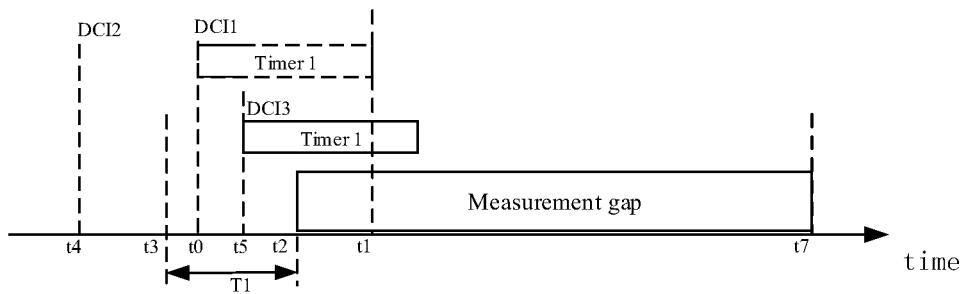
FIG. 4 is another schematic sequence diagram of a timer and a measurement gap according to an example.

For example, as shown in FIG. 4, the UE receives DCI 1 at time point t0 and DCI 1 is target DCI, so the UE starts the first timer for timing. At time point t5 which is within the period when the first timer is running, the UE receives DCI 3 and DCI 3 is target DCI as well, and the UE can reset the first timer to ensure that downlink data scheduled by DCI 3 can be transmitted without being affected by the measurement gap and thus completing data transmission. Since the first timer is restarted for timing, which is equivalent to an end time of the first timer being delayed, downlink data scheduled by DCI 1 can be transmitted without being affected by the measurement gap as well, and thus completing data transmission.

In one example, the data transmission method can further include: performing, in response to determining that a stop moment of the first timer is within the measurement gap and that an end moment of the measurement gap is not reached, inter-frequency signal measurement between the stop moment of the first timer and the end moment of the measurement gap.

Figure 5:
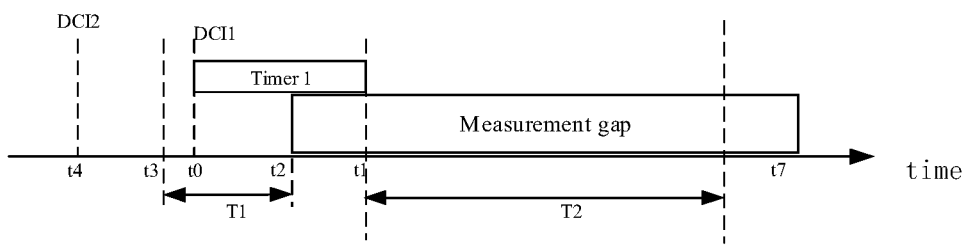
FIG. 5 is yet another schematic sequence diagram of a timer and a measurement gap according to an example.

As shown in FIG. 5, the time when the first timer stops timing is t1, a start moment of the measurement gap is t2, the end moment of the measurement gap is t7, t1 is located within the measurement gap, and time from 1 to t7 still belongs to the measurement gap. Therefore, the UE can perform inter-frequency signal measurement during the time from t1 to t7.

In this way, the inter-frequency signal measurement can be performed within the remaining time of the measurement gap, thereby improving the utilization rate of the remaining time of the measurement gap.

In one example, performing, in response to determining that the stop moment of the first timer is within the measurement gap and that the end moment of the measurement gap is not reached, inter-frequency signal measurement between the stop moment of the first timer and the end moment of the measurement gap includes: performing, in response to determining that a time difference between the stop moment of the first timer and the end moment of the measurement gap is greater than a second time length, the inter-frequency signal measurement between the stop moment of the first timer and the end moment of the measurement gap.

The UE's receiver takes a certain switching time to switch between the signal frequency of the serving cell and the signal frequency of the inter-frequency cell, which is referred to as the time period for the UE to perform one frequency switching. Therefore, in a case that a time difference between an end time point of a first running period and an end time point of the measurement gap is less than twice the inter-frequency switching time length, when the measurement gap ends, the UE cannot switch back to the frequency of the serving cell in time. That is, it cannot switch back to the serving cell for communication, thus resulting in useless switch operations and even delaying downlink communication with the serving cell. To alleviate the above situation as much as possible, the base station can configure the second time length based on at least the switching time length. The second time length may be greater than or equal to twice the time length for inter-frequency switching. In a specific example, the base station can configure the time length threshold based on other factors besides the frequency switching time length of the UE. For example, the other factors include: a resource configuration status of a system, global configuration of the base station, channel quality, and the like. The second time length is greater than or equal to twice the inter-frequency switching time length, which provides a basis for evaluating whether the UE can perform two times of inter-frequency switching. On the one hand, a remaining period of the measurement gap can be effectively used for inter-frequency signal measurement. On the other hand, situations that the UE cannot switch back to the serving cell in time can be reduced, and invalid inter-frequency switching can be reduced. The first running period can be referred to as the period when the first timer is running. In one example, the running period may indicate a time length for the first timer from starting running to stopping running.

In a case that a time difference between the end time point of the first running period and the end time point of the measurement gap is greater than a second time length, the UE can perform inter-frequency signal measurement from the end of the first running period until the end of the measurement gap when the UE switches back to the serving cell.

For example, as shown in FIG. 5, end moment t1 of the first running period is within the measurement gap for the UE to perform inter-frequency signal measurement. An interval from t1 to end moment t7 of the measurement gap is greater than second time length T2. In a case that the inter-frequency signal measurement is performed between t1 and t7, since the UE is to perform two instances of frequency switching, and considering time occupied by actual measurement of the inter-frequency signal measurement and the inter-frequency switching time length of the UE, the UE can switch back to a frequency of the serving cell at time point t7 to perform downlink communication. Therefore, the UE can perform the inter-frequency signal measurement during a time period from t1 to t7.

In this way, the inter-frequency signal measurement can be performed within remaining time of the measurement gap, that is, a part that the measurement gap does not overlap with the running time of the first timer, thereby improving the utilization rate of the remaining time of the measurement gap.

In one example, the data transmission method can further include: keeping, in response to determining that a time difference between the stop moment of the first timer and the end moment of the measurement gap is equal to or smaller than a second time length, the downlink communication with the serving cell between the stop moment of the first timer and the end moment of the measurement gap.

In a case that a time difference between the end time point of the first running period and the end time point of the measurement gap is less than or equal to the second time length, when the measurement gap ends, the UE cannot switch back to the frequency of the serving cell in time. That is, the UE cannot switch back to the serving cell for communication, thereby resulting in useless switch operations and even delaying downlink communication with the serving cell.

In a case that the time difference between the end time point of the first running period and the end time point of the measurement gap is less than or equal to the second time length, the UE may keep downlink communication with the serving cell. The second time length may be set by the base station through higher layer signaling.

For example, an end time point of the first running period is within the measurement gap for the UE to perform inter-frequency signal measurement. An interval from the end time point of the first running period to an end time point of the measurement gap is smaller than or equal to second time length T2. In a case that the inter-frequency signal measurement is performed within the time interval, since the UE is to perform two instances of frequency switching, and considering time occupied by the inter-frequency signal measurement and the inter-frequency switching time length of the UE, it can be determined that the UE cannot switch back to a frequency of the serving cell at the end time point of the measurement gap to perform downlink communication. Therefore, the UE can keep communication with the serving cell during the time interval without performing the inter-frequency signal measurement.

In this way, when the measurement gap ends, situations of being unable to switch to the frequency of the serving cell for downlink communication in time can be reduced. The reliability of downlink data reception during the transmission period can be improved, and ineffective frequency switching can be reduced at the same time.

In one example, the second time length is greater than or equal to a time length for the UE to perform two instances of inter-frequency switching.

In a case that the UE switches from receiving downlink data from a serving cell to performing inter-frequency signal measurement for a frequency of an inter-frequency cell, and then switches back to the serving cell for downlink communication, the UE's receiver is to switch from a signal frequency of the serving cell to the frequency of the inter-frequency cell, and then switches back to the frequency of the serving cell again, and the UE needs to perform processing such as configuring the receiver and the like. Therefore, the second time length may be greater than or equal to twice the inter-frequency switching time length of the UE.

In one example, the period when the first timer is running is greater than or equal to a longer one between a time length of resolving the DCI and a time length for a transmission resource of the predetermined service.

The time required by the UE from receiving DCI to completing the transmission of the predetermined service may include one of the following: the time to resolve the DCI; and transmission time of the predetermined service. Therefore, the first running period may be set to be greater than or equal to the greater one of the time length of resolving the DCI and the time length for a transmission resource of the predetermined service.

In this way, the UE can complete the transmission of the predetermined service within the first running period.

In one example, the first time length is greater than or equal to a time interval between two transmission resources of the predetermined service.

The first time length may be greater than or equal to a time interval between two transmission resources of the predetermined service. In this way, during the first time length, in a case that the base station is scheduling the predetermined service, it is more likely that scheduling for the predetermined service occurs, so that the UE can determine that there will be continuous scheduling for the predetermined service. The first time length cannot be set too long. Otherwise, the UE needs to start the first timer for pieces of DCI, which may increase the burden on the UE. When DCI is received during the first time length, the UE can set a timer and maintain downlink communication with the serving cell within a period when the first timer is running. In this way, a first timer can be set for a predetermined service whose transmission resource may overlap with a measurement gap, so that service data can be transmitted within a timing period and the transmission latency of the predetermined service can be reduced.

In one example, the data transmission method can further include:

receiving indication information, where the indication information indicates at least one of the first time length or the period when the first timer is running.

The base station can determine, according to a period for a PDSCH resource of a predetermined service configured by itself, at least one of the first time length or the period when the first timer is running, and transmit the determination through the indication information to the UE.

In one example, the inter-frequency signal measurement includes at least one of:

reference signal measurement performed on one or more inter-frequency cells;

or

Synchronization Signal Block (SSB) listening performed on one or more inter-frequency cells.

The measurement gap for the UE to perform the inter-frequency signal measurement on an inter-frequency cell includes at least one of: a measurement gap for reference signal measurement performed by the UE on the inter-frequency cell; or a duration period for SSB listening performed by the UE on the inter-frequency cell.

The reference signal measurement may include that a UE measures a reference signal from an inter-frequency cell for performing mobility measurement. The UE may measure the reference signal from the inter-frequency cell at intervals. The base station may configure periodic measurement gaps for the UE.

The base station may configure periodic duration periods for the UE to listen to the SSB(s) from the inter-frequency cell.

In one example, determining that the DCI schedules the transmission of the predetermined service includes at least one of:

determining, based on indication information of a predetermined information field in the DCI, that the DCI schedules the transmission of the predetermined service;

determining, based on a format of the DCI, that the DCI schedules the transmission of the predetermined service; or determining, based on a Radio Network Temporary Identifier (RNTI) used for scrambling a Cyclic Redundancy Check (CRC) of the DCI, that the DCI schedules the transmission of the predetermined service.

The UE may determine, through at least one of the indication information of the predetermined information field in the DCI, the format of the DCI or the RNTI used for scrambling the CRC of the DCI, whether the received DCI is used to schedule transmission of the predetermined service, for example, whether the received DCI belongs to target DCI. For example, for a predetermined service such as URLLC service data, a more compact DCI format can be used, and a DCI format with a relatively large number of bits can be used for a non-predetermined service. For another example, an RNTI used for scrambling CRC of DCI which is used to schedule the URLLC downlink data is different from an RNTI used when other services are scheduled.

In this way, the UE can effectively differentiate DCI for scheduling different downlink data, and improve the DCI differentiation efficiency.

In one example, the first timer stopping timing includes:

the first timer stopping timing when the first timer expires, or the first timer stopping timing at an end moment of the measurement gap.

A condition for the first timer to stop running may include a condition that the first timer expires, and may also include a condition that the first timer stops running when the current measurement gap ends.

Figure 6:
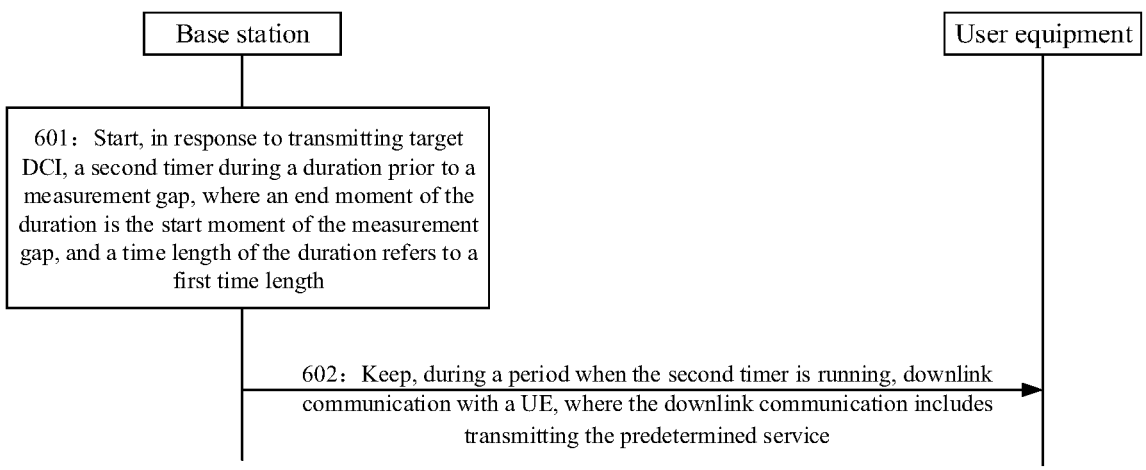
FIG. 6 is a schematic flowchart illustrating a data transmission method according to an example.

As shown in FIG. 6, the present example provides a data transmission method, which can be applied to a base station for wireless communication. The method includes the following steps.

At step 601, starting, in response to transmitting target Downlink Control Information (DCI), a second timer during a duration prior to a measurement gap, where an end moment of the duration is the start moment of the measurement gap, and a time length of the duration refers to a first time length; and At step 602, keeping, during a period when the second timer is running, downlink communication with a User Equipment (UE), where the downlink communication includes transmitting the predetermined service.

The measurement gap may be a periodic measurement period configured by a base station for the UE to perform inter-frequency signal measurement. In a case that a bandwidth of the UE's receiver is not sufficient to cover both signal frequencies of a serving cell and an inter-frequency cell, the UE cannot perform inter-frequency signal measurement on the inter-frequency cell and data transmission with the serving cell at the same time. During the measurement gap, normal data service transmission and reception between the UE and the serving cell can be interrupted, which results in latency in downlink data transmission. When the measurement gap ends, the UE can return to the frequency of the serving cell, and can continue the normal data service transmission and reception and possible intra-frequency measurement.

An inter-frequency signal may be a signal with a central frequency different from the central frequency of a serving cell where the UE is currently located. The inter-frequency signal may also be a signal of an inter-frequency cell with one or more Band Width Parts (BWPs) other than a BWP currently occupied by the UE. The inter-frequency signal may further be one or more signals of inter-frequency cells with different central frequencies or different Sub-Carrier Spaces (SCSs) in SSB measurement and the like. The inter-frequency signal measurement may indicate performing signal quality measurement on an inter-frequency signal or listening to an inter-frequency signal.

The first time length can be determined according to a scheduling interval of the predetermined service or the like. The first time length may be greater than or equal to a time interval between two transmission resources of the predetermined service. In this way, during the first time length, in a case that the base station is transmitting or is to transmit the predetermined service, it is more likely that scheduling for the predetermined service is transmitted. That is, the DCI in step 601 and the DCI also refers to as target DCI, so that the UE can determine whether there will be scheduling for the predetermined service based on the received target DCI. The first time length cannot be set too long. Otherwise, the UE needs to start the first timer for pieces of target DCI, which may increase the computing burden on the UE. When target DCI is received within the first time length, the UE can set the first timer and maintain downlink communication with the serving cell within a period when the first timer is running, to start from a time of receiving the DCI. In this way, a first timer can be set for a predetermined service whose transmission resource may overlap with a measurement gap in time domain, so that service data can be transmitted within a running period and the transmission latency of the predetermined service can be reduced.

The predetermined service may be a service with a higher priority, or a downlink data service which requires shorter latency, for example, URLLC service data. The base station may issue target DCI to schedule a predetermined service, and the DCI may be received by the UE. Contents in DCI of a physical layer can be used to indicate whether the scheduled downlink service is a high-priority service, and in a case that the DCI indicates the scheduled downlink service is the high-priority service, UE determines that the service is the predetermined service.

Keeping downlink communication with the UE may include transmitting the predetermined service to the UE, or may also include that the UE receives a downlink signal transmitted by the serving cell to the UE through downlink, or the UE listens to a downlink signal from the serving cell through the downlink, and the like. The downlink signal includes, but is not limited to, one or more controlling instructions and downlink data transmitted by the serving cell to the UE.

Similarly, the base station keeping downlink communication with the UE may include transmitting the predetermined service, or may also include that the serving cell transmits a downlink signal to the UE through the downlink when needed, or that the serving cell maintains a downlink connection with the UE.

When the UE determines that the received DCI is used to schedule transmission of the predetermined service, the UE may set a running period for the first timer, and maintain downlink communication with the serving cell within the period when the first timer is running. The period when the first timer is running may be determined according to a time period for the UE to resolve the DCI, a time period for transmission resources of the predetermined service, and the like. This ensures that, within the period when the first timer is running, the UE can complete the reception of predetermined service data that is involved in the current target DCI scheduling. The UE does not perform inter-frequency signal measurement during the period when the first timer is running. Therefore, during the period when the first timer is running, the transmission of service data may not be affected by the inter-frequency signal measurement, thereby reducing the latency for the transmission of service data. When the base station determines to perform transmission of the predetermined service, the base station may transmit target DCI, set a second timer and a running period for the second timer, and maintain downlink communication with the UE within the period when the second timer is running. The period when the second timer is running may be determined according to a time period for the UE to resolve the DCI, a time period for transmission resources of the predetermined service, and the like, which ensures that, within the period when the second timer is running, the UE can complete the reception of the predetermined service data that is involved in the current target DCI scheduling. The UE does not perform inter-frequency signal measurement during the period when the second timer is running. The first timer can be kept in synchronization with the second timer, so that the UE and the base station can keep downlink communication with each other at the same time.

As shown in FIG. 3, at time t0, the base station transmits DCI 1 for scheduling downlink data with a first priority which is transmitted at PDSCH resources, t0 is within a time period T1 prior to the measurement gap. The UE can set a first timer at time t0, and the base station can start a second timer at time t0. Running periods of the first timer and the second timer may be the same, and a time interval from time t0 to time t1 indicates the running periods of the first timer and the second timer. During the period when the first timer is running, that is, during the period when the second timer is running, the UE keeps downlink communication with the base station. In a case where a time period overlapping with the measurement gap exists within the running periods of the two timers, during the overlapped time period, for example, during a time period between t2 to t1, the UE can keep downlink communication with the base station for downlink data transmission.

As shown in FIG. 3, at time t4, the base station transmits DCI 2 for scheduling a predetermined service with the first priority which is transmitted at PDSCH resources, and t4 is located before the time period T1 prior to the measurement gap, that is, before time t3, so a timer may not be set for DCI 2.

In this way, during the period when the second timer is running, the UE and the base station can complete the transmission of the predetermined service without being affected by the inter-frequency signal measurement, which reduces situations in which the transmission of the predetermined service is stopped due to performing the inter-frequency signal measurement. This reduces the transmission latency of the predetermined service and meets the requirements of low-latency service transmission.

In one example, the data transmission method further includes:

keeping, in response to determining that: a stop moment of the second timer is within the measurement gap, an end moment of the measurement gap is not reached, and a time difference between the stop moment of the second timer and the end moment of the measurement gap is less than or equal to a second time length;

downlink communication with a User Equipment (UE) between the stop moment of the second timer and the end moment of the measurement gap.

The UE's receiver takes a certain switching time length while switching between a signal frequency of the serving cell and a signal frequency of the inter-frequency cell, which is referred to as a time length for the UE to perform one time of frequency switching. Therefore, in a case that a time difference between an end time point of a second running period and an end time point of the measurement gap is less than twice the inter-frequency switching time length, when the measurement gap ends, the UE cannot switch back to the frequency of the serving cell in time. That is, the UE cannot switch back to the serving cell for communication, thus resulting in useless switch operations and even delaying downlink communication with the serving cell. To alleviate the above situation as much as possible, the base station can configure the second time length based on at least the switching time length. The second time length may be greater than or equal to twice the time length for inter-frequency switching. In a specific example, the base station can configure the time length threshold based on other factors besides the frequency switching time length of the UE. For example, the other factors include: a resource configuration status of a system, global configuration of the base station, channel quality, and the like. The second time length is greater than or equal to twice the inter-frequency switching time length, which provides a basis for evaluating whether the UE can perform two instances of inter-frequency switching. On the one hand, a remaining period of the measurement gap can be effectively used for inter-frequency signal measurement. On the other hand, situations that the UE cannot switch back to the serving cell in time can be reduced, and invalid inter-frequency switching can be reduced. In a case that a time difference between the end time point of the second running period and the end time point of the measurement gap is less than or equal to the second time length, when the measurement gap ends, the UE cannot switch back to the frequency of the serving cell in time. That is, the UE cannot switch back to the serving cell for communication, thereby resulting in useless switching operations and even delaying downlink communication with the serving cell. The second running period can be referred to as the period when the second timer is running.

Therefore, in a case that the time difference between the end time point of the first running period and the end time point of the measurement gap is less than or equal to the second time length, the UE may keep downlink communication with the serving cell. The second time length may be set by the base station through higher layer signaling.

In one example, the second time length is greater than or equal to a time length for the UE to perform two instances of inter-frequency switching.

In a case that the UE switches from receiving downlink data from a serving cell to performing inter-frequency signal measurement for a frequency of an inter-frequency cell, and then switches back to the serving cell for downlink communication, the UE's receiver is to switch from a signal frequency of the serving cell to the frequency of the inter-frequency cell, and then switches back to the frequency of the serving cell again, and the UE needs to perform processing such as configuring the receiver and the like. Therefore, the second time length may be greater than or equal to twice the inter-frequency switching time length of the UE.

In one example, the period when the second timer is running is greater than or equal to a longer one of a time length for a UE to resolve the target DCI and a time length for a transmission resource of the predetermined service.

The time required by the UE from receiving DCI to completing the transmission of the predetermined service may include one of the following: the time to resolve the DCI; and transmission time of the predetermined service. Therefore, the second running period may be set to be greater than or equal to the greater one of the time length of resolving the DCI and the time length for a transmission resource of the predetermined service.

In this way, the UE can complete the transmission of the predetermined service within the first running period.

In one example, the first time length is greater than or equal to a time interval between two transmission resources of the predetermined service.

The first time length may be greater than or equal to a time interval between two transmission resources of the predetermined service. In this way, during the first time length, in a case that the base station is transmitting or is to transmit the predetermined service, it is more likely that scheduling for the predetermined service is transmitted, that is, the DCI in step 601, and the DCI also refers to the target DCI, so that the UE can determine whether there will be continuous scheduling for the predetermined service based on the received target DCI. The first time length cannot be set too long. Otherwise, the UE needs to start the first timer for pieces of target DCI, which may increase the computing burden on the UE. When target DCI is received within the first time length, downlink communication with the serving cell can be maintained within a period when the first timer is running from receiving the DCI. In this way, a first timer can be set for a predetermined service whose transmission resource may overlap with a measurement gap, so that service data can be transmitted within a timing period and the transmission latency of the predetermined service can be reduced.

In one example, the data transmission method can further include:

transmitting indication information, where the indication information indicates at least one of the first time length or the period when the second timer is running.

The base station can determine, according to a period for a PDSCH resource of a predetermined service configured by itself, at least one of the first time length or the period when the first timer is running, and transmit through the indication information to the UE.

In one example, for indicating that the target DCI corresponds to the transmission of the predetermined service, at least one of the following manners is used:

using indication information corresponding to the predetermined service in a predetermined information field of the target DCI;

and/or using a DCI format corresponding to the predetermined service;

and/or scrambling Cyclic Redundancy Check (CRC) of the target DCI with a Radio Network Temporary Identifier (RNTI) corresponding to the predetermined service.

The base station may set indication information in the predetermined information field of DCI to indicate that the DCI is used to schedule a predetermined service, and the UE may determine whether received DCI is used to schedule transmission of a predetermined service through the indication information in the predetermined information field of the DCI.

The base station may use different DCI formats to indicate different services scheduled by DCI, and the UE may determine whether received DCI is used to schedule transmission of a predetermined service through a format of the DCI.

The base station may also use different RNTIs in scrambling CRC of DCI to indicate different services scheduled by the DCI, and the UE may determine whether received DCI is used to schedule transmission of a predetermined service through RNTI.

For example, for a predetermined service such as URLLC service data, a more compact DCI format can be used, and a DCI format with a relatively large number of bits can be used for a non-predetermined service. For another example, an RNTI used for scrambling CRC of DCI which is used to schedule the URLLC downlink data is different from an RNTI used when other services are scheduled.

In this way, the UE can effectively differentiate DCI for scheduling different downlink data, and improve the DCI differentiation efficiency.

A specific example is provided below in conjunction with any of the above-mentioned examples.

A UE can determine, through a difference in DCI formats or RNTIs used for scrambling CRC of DCI, whether received DCI is for scheduling downlink data with a first priority which is transmitted at PDSCH resources, or is for scheduling downlink data with a second priority which is transmitted at PDSCH resources. For example, for the downlink data with the first priority which is transmitted at the PDSCH resources such as URLLC service data, a more compact DCI format can be used, while for the downlink data with the second priority which is transmitted at the PDSCH resources, a DCI format with a relatively large number of bits can be used. For another example, an RNTI used for scrambling CRC of DCI which is used to schedule URLLC downlink data is different from an RNTI used when other services are scheduled.

Figure 7:
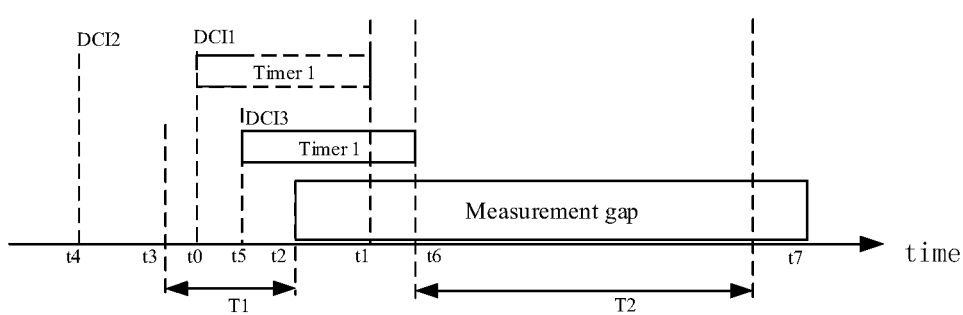
FIG. 7 is still another schematic sequence diagram of a timer and a measurement gap according to an example.

As shown in FIG. 7, during T1 which is prior to a start time point of the current measurement gap, in a case that a UE receives DCI 1 for scheduling URLLC service, the UE starts Timer 1 for timing. In a case that DCI 2 is received before T1, the UE may not start Timer 1.

At least one of T1 or a running time of Timer 1 is set by a base station through higher layer signaling. The base station can configure at least one of T1 or the running time of Timer 1 through Radio Resource Control (RRC) layer signaling and MAC layer signaling. In a case that, during Timer 1, the UE continues receiving DCI 3 for scheduling URLLC data from the base station, Timer 1 is reset.

A condition for Timer 1 to stop running: when Timer 1 expires or when the current measurement gap ends, Timer 1 stops running.

In a case that Timer 1 stops running and the current measurement gap has not ended, the UE can enter the measurement gap to perform inter-frequency signal measurement.

Consider that frequency switching needs to be performed when a UE performs inter-frequency measurement, so that a certain switching delay is needed. A possible solution indicates: in a case that a time difference between an end time of Timer 1 and an end time point of the current measurement gap for the UE is greater than T2, the UE can perform inter-frequency signal measurement during the remaining time of the measurement gap. In a case where the time difference is less than T2, the UE may keep receiving downlink information at a frequency of the serving cell. A time length of T2 is set by the base station through high-layer signaling.

Figure 8:
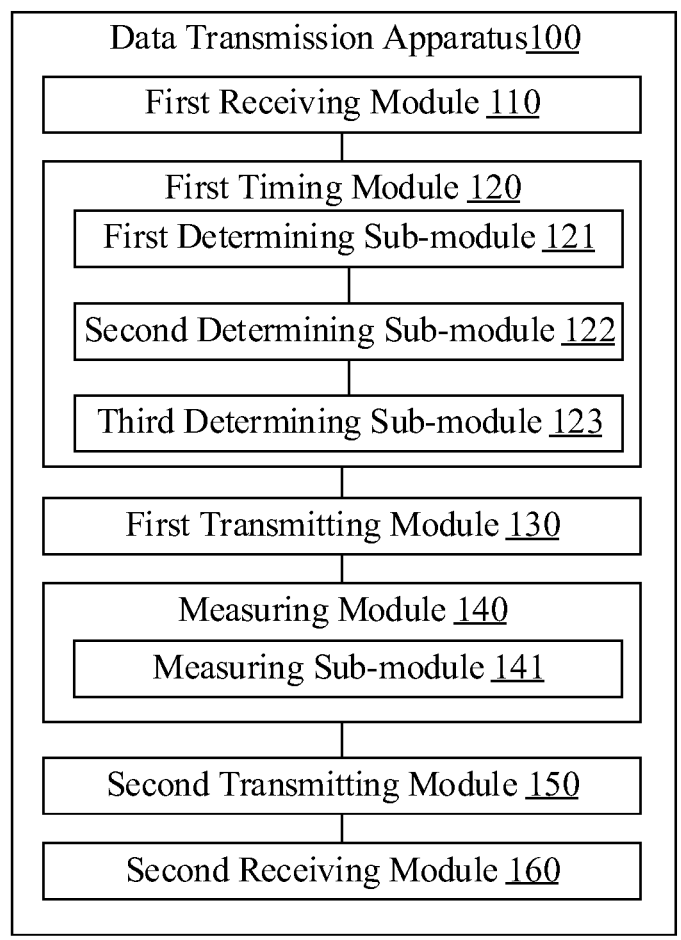
FIG. 8 is a structural block diagram illustrating a composition of a data transmission apparatus according to an example.

Examples of the present disclosure further provide a data transmission apparatus, which is applied to a User Equipment (UE) for wireless communication. FIG. 8 is a structural block diagram illustrating a composition of a apparatus 100 according to examples of the present disclosure. As shown in FIG. 8, the apparatus 100 includes a first receiving module 110, a first timing module 120 and a first transmitting module 130, where the first receiving module 110 is configured to receive Downlink Control Information (DCI) during a first time length prior to a start moment of a measurement gap;

the first timing module 120 is configured to start, in response to determining that the DCI schedules transmission of a predetermined service, a first timer; and the first transmitting module 130 is configured to keep, during a period when the first timer is running, downlink communication with a serving cell, where the downlink communication includes transmitting the predetermined service.

In one example, the apparatus 100 further includes:

a measuring module 140, configured to perform, in response to determining that a stop moment of the first timer is within the measurement gap and that an end moment of the measurement gap is not reached, inter-frequency signal measurement between the stop moment of the first timer and the end moment of the measurement gap.

In one example, the measuring module 140 includes:

a measuring sub-module 141, configured to perform, in response to determining that a time difference between the stop moment of the first timer and the end moment of the measurement gap is greater than a second time length, the inter-frequency signal measurement between the stop moment of the first timer and the end moment of the measurement gap.

In one example, the apparatus 100 further includes:

a second transmitting module 150, configured to keep, in response to determining that a time difference between the stop moment of the first timer and the end moment of the measurement gap is equal to or smaller than a second time length, the downlink communication with the serving cell between the stop moment of the first timer and the end moment of the measurement gap.

In one example, the second time length is greater than or equal to a time length for the UE to perform two times of inter-frequency switching.

In one example, the period when the first timer is running is greater than or equal to a longer one of, a time length of resolving the DCI and a time length for a transmission resource of the predetermined service.

In one example, the first time length is greater than or equal to a time interval between two transmission resources of the predetermined service.

In one example, the apparatus 100 further includes:

a second receiving module 160, configured to receive indication information, where the indication information indicates at least one of the first time length or the period when the first timer is running.

In one example, the inter-frequency signal measurement includes at least one of:
reference signal measurement performed on one or more inter-frequency cells;
or
Synchronization Signal Block (SSB) listening performed on one or more inter-frequency cells.

In one example, the first timing module 120 includes at least one of:
a first determining sub-module 121, configured to determine, based on indication information of a predetermined information field in the DCI, that the DCI schedules the transmission of the predetermined service;
a second determining sub-module 122, configured to determine, based on a format of the DCI, that the DCI schedules the transmission of the predetermined service; or
a third determining sub-module 123, configured to determine, based on a Radio Network Temporary Identifier (RNTI) used for scrambling Cyclic Redundancy Check (CRC) of the DCI, that the DCI schedules the transmission of the predetermined service.

In one example, the first timer stopping timing includes:
the first timer stopping timing when the first timer expires;
or
the first timer stopping timing at the end moment of the measurement gap.

Figure 9:
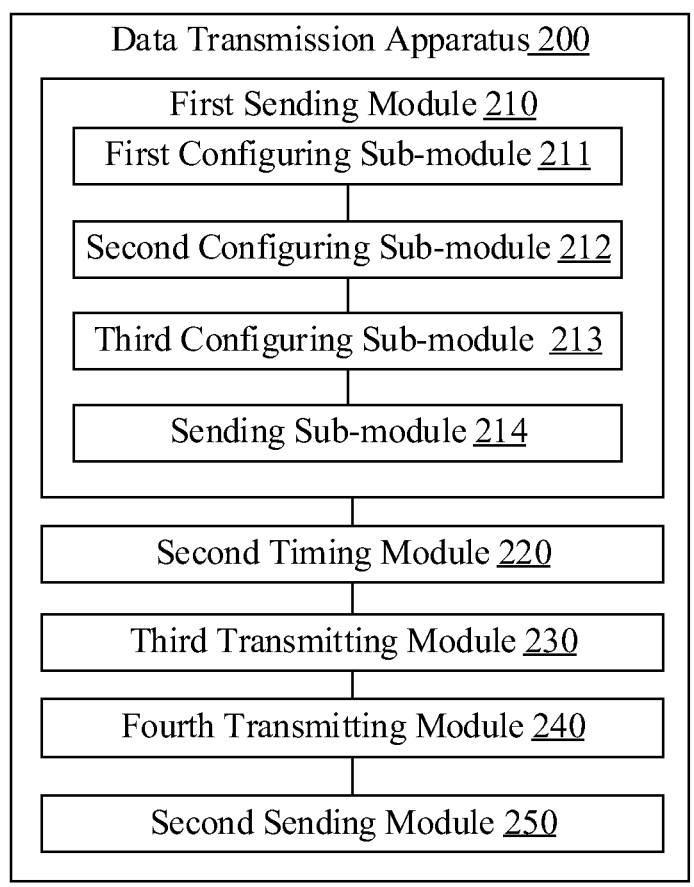
FIG. 9 is a structural block diagram illustrating a composition of another data transmission apparatus according to an example.

Examples of the present disclosure further provide a data transmission apparatus, which is applied to a base station for wireless communication. FIG. 9 is a structural block diagram illustrating a composition of a apparatus 200 according to examples of the present disclosure. As shown in FIG. 9, the apparatus 200 includes a first sending module 210, a second timing module 220 and a third transmitting module 230, where
the first sending module 210 is configured to transmit Downlink Control Information (DCI) during a first time length prior to a start moment of a measurement gap;
the second timing module 220 is configured to start, in response to determining that the DCI schedules transmission of a predetermined service, a second timer; and
the third transmitting module 230 is configured to keep, during a period when the second timer is running, downlink communication with a serving cell, where the downlink communication includes transmitting the predetermined service.

In one example, the apparatus 200 further includes:
a fourth transmitting module 240, configured to keep, in response to determining that: a stop moment of the second timer is within the measurement gap, an end moment of the measurement gap is not reached, and a time difference between the stop moment of the second timer and the end moment of the measurement gap is less than or equal to a second time length; downlink communication with a User Equipment (UE) between the stop moment of the second timer and the end moment of the measurement gap.

In one example, the second time length is greater than or equal to a time length for the UE to perform two times of inter-frequency switching.

In one example, the period when the second timer is running is greater than or equal to a longer one of a time length for a UE to resolve the DCI and a time length for a transmission resource of the predetermined service.

In one example, the first time length is greater than or equal to a time interval between two transmission resources of the predetermined service.

In one example, the apparatus 200 further includes:
a second sending module 250, configured to transmit indication information, where the indication information indicates at least one of the first time length or the period when the second timer is running.

In one example, the first sending module 210 includes at least one of:
a first configuring sub-module 211, configured to use indication information corresponding to the predetermined service in a predetermined information field of the DCI;
and/or
a second configuring sub-module 212, configured to use a DCI format corresponding to the predetermined service;
and/or
a third configuring sub-module 213, configured to use scramble Cyclic Redundancy Check (CRC) of the DCI with a Radio Network Temporary Identifier (RNTI) corresponding to the predetermined service; and
a sending sub-module 214, configured to transmit the DCI.

In one example, the first receiving module 110, the first timing module 120, the first transmitting module 130, the measuring module 140, the second transmitting module 150, the second receiving module 160, the first sending module 210, the second timing module 220, the third transmitting module 230, the fourth transmitting module 240 and the second sending module 250 and the like can be implemented by one or more Central Processing Units (CPUs), Graphics Processing Units (GPUs), baseband processors (BPs), Application Specific Integrated Circuits (ASICs), digital signal processing devices (DSPs), Programmable Logic Devices (PLDs), Complex Programmable Logic Devices (CPLDs), Field-Programmable Gate Array (FPGA), general-purpose processors, controllers, Micro Controller Units (MCUs), microprocessors or other electronic elements for performing the above method.

Figure 10:
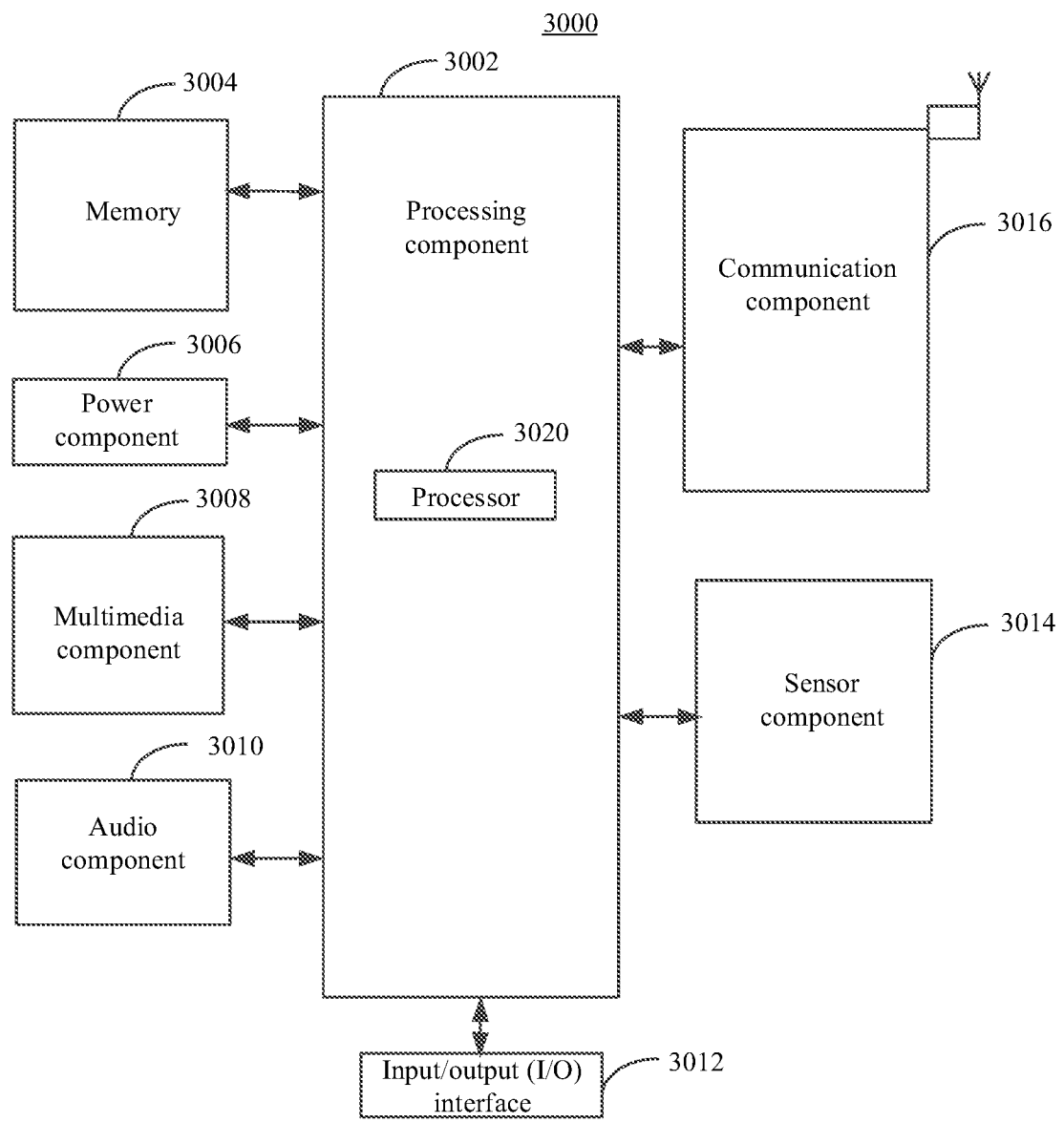
FIG. 10 is a block diagram illustrating a device for data transmission according to an example.

FIG. 10 is a schematic block diagram illustrating a device 3000 for data transmission according to some examples of the present disclosure. For example, device 3000 can be a mobile phone, a computer, a digital broadcast terminal, a message transmitting and receiving device, a gaming console, a tablet device, a medical device, a fitness device, a personal digital assistant, and the like.

As shown in FIG. 10, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 generally controls overall operations of the device 3000, such as operations associated with display, phone calls, data communications, camera operations, and recording operations. Processing component 3002 can include one or more processors 3020 to execute instructions to perform all or part of the steps described above. In addition, the processing component 3002 may include one or more modules that facilitate the interaction between the processing component 3002 and other components. For example, processing component 3002 can include a multimedia module to facilitate interaction between multimedia component 3008 and processing component 3002.

Memory 3004 is configured to store various types of data to support operation at device 3000. Examples of such data include instructions for any application or method operated on the device 3000, contact data, phonebook data, messages, pictures, videos, and so on. The memory 3004 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

Power component 3006 provides power to various components of device 3000. Power component 3006 can include a power management system, one or more power sources, and other components associated with generating, managing, and distributing power for device 3000.

The multimedia component 3008 includes a screen between the device 3000 and the user that provides an output interface. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation. In some examples, the multimedia component 3008 may include a front camera and/or a rear camera. In response to the device 3000 being in an operation mode, such as a shooting mode or a video mode, the front camera and/or the rear camera can receive external multimedia data. Each front and rear camera can be a fixed optical lens system or have focal length and optical zoom capabilities.

The audio component 3010 may be configured to output and/or input an audio signal. For example, the audio component 3010 may include a microphone (MIC) configured to receive an external audio signal in response to the device 3000 being in an operating mode, such as a call mode, a recording mode, and a voice recognition mode. The received audio signal may be further stored in the memory 3004 or sent via the communication component 3016. In some examples, the audio component 3010 further includes a speaker to output an audio signal.

The I/O interface 3012 provides an interface between the processing component 3002 and peripheral interface modules. The above peripheral interface modules may be a keyboard, a click wheel, buttons, and so on. These buttons may include, but are not limited to, a home button, a volume button, a start button, and a lock button.

The sensor component 3014 may include one or more sensors to provide status assessments of various aspects for the device 3000. For example, sensor component 3014 can detect an open/closed state of device 3000, a relative positioning of components, such as the display and keypad of device 3000, and sensor component 3014 can also detect a change in position of device 3000 or a component of device 3000, the presence or absence of user contact with device 3000, orientation or acceleration/deceleration of device 3000, and temperature change of device 3000. The sensor component 3014 may include a proximity sensor configured to detect the presence of a nearby object without any physical contact. The sensor component 3014 may further include an optical sensor, such as a CMOS or CCD image sensor which is used in imaging applications. In some examples, the sensor component 3014 may further include an acceleration sensor, a gyroscope sensor, a magnetic sensor, a pressure sensor, or a temperature sensor.

The communication component 3016 may be configured to facilitate wired or wireless communication between the device 3000 and other devices. The device 3000 can access a wireless network based on a communication standard, such as WiFi, 2G, 30G, 4G or 5G or a combination thereof. In an exemplary example, communication component 3016 receives broadcast signals or broadcast associated information from an external broadcast management system via a broadcast channel. In an exemplary example, the communication component 3016 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an exemplary example, device 3000 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements for performing the method described in any of the above examples.

In an example, there is also provided a non-transitory computer readable storage medium including instructions, such as a memory 3004 including instructions executable by processor 3020 of device 3000 to perform the above method. For example, the non-transitory computer readable storage medium may be a ROM, a random access memory (RAM), a CD-ROM, a magnetic tape, a floppy disk, and an optical data storage device.

Other implementations of the present disclosure will be readily apparent to those skilled in the art after implementing the disclosure by referring to the specification. The present application is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above described structures shown in the drawings, and various changes and modifications can be made to the disclosure without departing from the scope thereof. The scope of the disclosure is to be limited only by the appended claims.

The invention claimed is:

1. A method for data transmission performed by User Equipment (UE), the method comprising:
  receiving Downlink Control Information (DCI) during a duration prior to a measurement gap, wherein an end moment of the duration is the start moment of the measurement gap, and a time length of the duration refers to a first time length;
  starting, in response to determining that the DCI schedules transmission of a predetermined service, a first timer;
  keeping, during a period when the first timer is running, downlink communication with a serving cell, wherein the downlink communication comprises receiving the predetermined service; and performing, in response to determining that a stop moment of the first timer is within the measurement gap and that an end moment of the measurement gap is not reached, inter-frequency signal measurement between the stop moment of the first timer and the end moment of the measurement gap.

2. The method according to claim 1, wherein performing, in response to determining that the stop moment of the first timer is within the measurement gap and that the end moment of the measurement gap is not reached, the inter-frequency signal measurement between the stop moment of the first timer and the end moment of the measurement gap comprises:

performing, in response to determining that a time difference between the stop moment of the first timer and the end moment of the measurement gap is greater than a second time length, the inter-frequency signal measurement between the stop moment of the first timer and the end moment of the measurement gap.

3. The method according to claim 2, wherein the second time length is greater than or equal to a time length for the UE to perform two times of inter-frequency switching.

4. The method according to claim 1, further comprising:
keeping, in response to determining that a time difference between the stop moment of the first timer and the end moment of the measurement gap is equal to or smaller than the second time length, the downlink communication with the serving cell between the stop moment of the first timer and the end moment of the measurement gap.

5. The method according to claim 1, wherein the period when the first timer is running is greater than or equal to a longer one between a time length of resolving the DCI and a time length for a transmission resource of the predetermined service.

6. The method according to claim 1, wherein the first time length is greater than or equal to a time interval between two transmission resources of the predetermined service.

7. The method according to claim 1, further comprising:
receiving indication information, wherein the indication information indicates at least one of:
the first time length;
or
the period when the first timer is running.

8. The method according to claim 1, wherein the inter-frequency signal measurement comprises at least one of:
reference signal measurement performed on one or more inter-frequency cells;
or
Synchronization Signal Block (SSB) listening performed on one or more inter-frequency cells.

9. The method according to claim 1, wherein determining that the DCI schedules the transmission of the predetermined service comprises at least one of:
determining, based on indication information of a predetermined information field in the DCI, that the DCI schedules the transmission of the predetermined service;
determining, based on a DCI format, that the DCI schedules the transmission of the predetermined service; or
determining, based on a Radio Network Temporary Identifier (RNTI) used for scrambling Cyclic Redundancy Check (CRC) of the DCI, that the DCI schedules the transmission of the predetermined service.

10. The method according to claim 1, further comprising:
the first timer stopping timing when the first timer expires;
or
the first timer stopping timing at the end moment of the measurement gap.

11. A method for data transmission, performed by a base station, the method comprising:
starting, in response to transmitting target Downlink Control Information (DCI), a second timer during a duration prior to a measurement gap, wherein an end moment of the duration is the start moment of the measurement gap, and a time length of the duration refers to a first time length;
keeping, during a period when the second timer is running, downlink communication with a User Equipment (UE), wherein the downlink communication comprises transmitting the predetermined service; and
keeping, in response to determining that a stop moment of the second timer is within the measurement gap, an end moment of the measurement gap is not reached, and a time difference between the stop moment of the second timer and the end moment of the measurement gap is less than or equal to a second time length, downlink communication with the UE between the stop moment of the second timer and the end moment of the measurement gap.

12. The method according to claim 11, wherein the second time length is greater than or equal to a time length for the UE to perform two times of inter-frequency switching.

13. The method according to claim 11, wherein the period when the second timer is running is greater than or equal to a longer one between a time length for the UE to resolve the target DCI and a time length for a transmission resource of the predetermined service.

14. The method according to claim 11, wherein the first time length is greater than or equal to a time interval between two transmission resources of the predetermined service.

15. The method according to claim 11, further comprising:
transmitting indication information, wherein the indication information indicates at least one of:
the first time length;
or
the period when the second timer is running.

16. The method according to claim 11, wherein for indicating that the target DCI corresponds to the transmission of the predetermined service, the target DCI uses at least one of:
indication information corresponding to the predetermined service in a predetermined information field of the target DCI;
a DCI format corresponding to the predetermined service;
or
Cyclic Redundancy Check (CRC) of the target DCI scrambled with a Radio Network Temporary Identifier (RNTI) corresponding to the predetermined service.

17. A communication device, comprising:
a transceiver,
a memory that stores an executable program stored, and
one or more processors that are communicatively coupled to the memory and the transceiver,
wherein the executable program when collectively executed by the one or more processors causes the communication device to act as the base station and perform the method of claim 11.

18. A communication device, comprising:

a transceiver, a memory that stores an executable program, and one or more processors communicatively coupled to the transceiver and the memory, wherein the executable program when collectively executed by the one or more processors cause the communication device to:

receive Downlink Control Information (DCI) during a duration prior to a measurement gap, wherein an end moment of the duration is the start moment of the measurement gap, and a time length of the duration refers to a first time length;

start, in response to determining that the DCI schedules transmission of a predetermined service, a first timer;

keep, during a period when the first timer is running, downlink communication with a serving cell, wherein the downlink communication comprises receiving the predetermined service; and perform, in response to determining that a stop moment of the first timer is within the measurement gap and that an end moment of the measurement gap is not reached, inter-frequency signal measurement between the stop moment of the first timer and the end moment of the measurement gap.

* * * * *